(No Model.) 2 Sheets—Sheet 1.

J. A. BRILL & W. S. ADAMS.
MOTOR TRUCK.

No. 538,865. Patented May 7, 1895.

WITNESSES:
C. W. Benjamin
William Jacobsen

INVENTORS
John A. Brill &
Walter S. Adams
BY Joseph L. Levy
ATTORNEY (No Model.) 2 Sheets—Sheet 2.

J. A. BRILL & W. S. ADAMS.
MOTOR TRUCK.

No. 538,865. Patented May 7, 1895.

WITNESSES:
C. W. Benjamin
William Jacobsen.

INVENTORS
John A. Brill &
Walter S. Adams.
BY Joseph L. Levy
ATTORNEY

UNITED STATES PATENT OFFICE.

JOHN A. BRILL AND WALTER S. ADAMS, OF PHILADELPHIA, PENNSYLVANIA; SAID ADAMS ASSIGNOR TO SAID BRILL.

MOTOR-TRUCK.

SPECIFICATION forming part of Letters Patent No. 538,865, dated May 7, 1895.

Application filed January 3, 1894. Serial No. 495,546. (No model.)

*To all whom it may concern:*

Be it known that we, JOHN A. BRILL and WALTER S. ADAMS, citizens of the United States, residing at Philadelphia, in the county of Philadelphia and State of Pennsylvania, have made certain new and useful Improvements in Motor-Trucks, of which the following is a specification.

Our improvements relate more specifically to pivotal motor trucks and are shown as applied to a car truck in which the wheels are the same size, and in which the car supporting springs are located midway between the wheels and on a line with the pivotal center of the truck.

The present object of our invention is to provide a solid, substantial and economical truck, among the main features of which are supporting the car springs on the axle box frame, which is substantially stationary as regards the movement of the car on the springs, and forming a drawing connection between the car and truck in such a way that the truck portion of such connection will not partake of the movement of the car body on its supporting springs.

The improvements in the axle box frame consist in the side bars having parallel chords arranged in pairs, and having a vertical space between them in which are to be located the car supporting springs, which chords are united to the axle box yokes, from which are extensions that are connected with cross bars, the chords constituting pedestals for the car spring posts and bolsters for the side springs.

The invention further consists in the novel details of improvement, and the combination of parts that will be more fully hereinafter set forth and then pointed out in the claims.

Reference is to be had to the accompanying drawings, forming part hereof, wherein—

Figure 1:
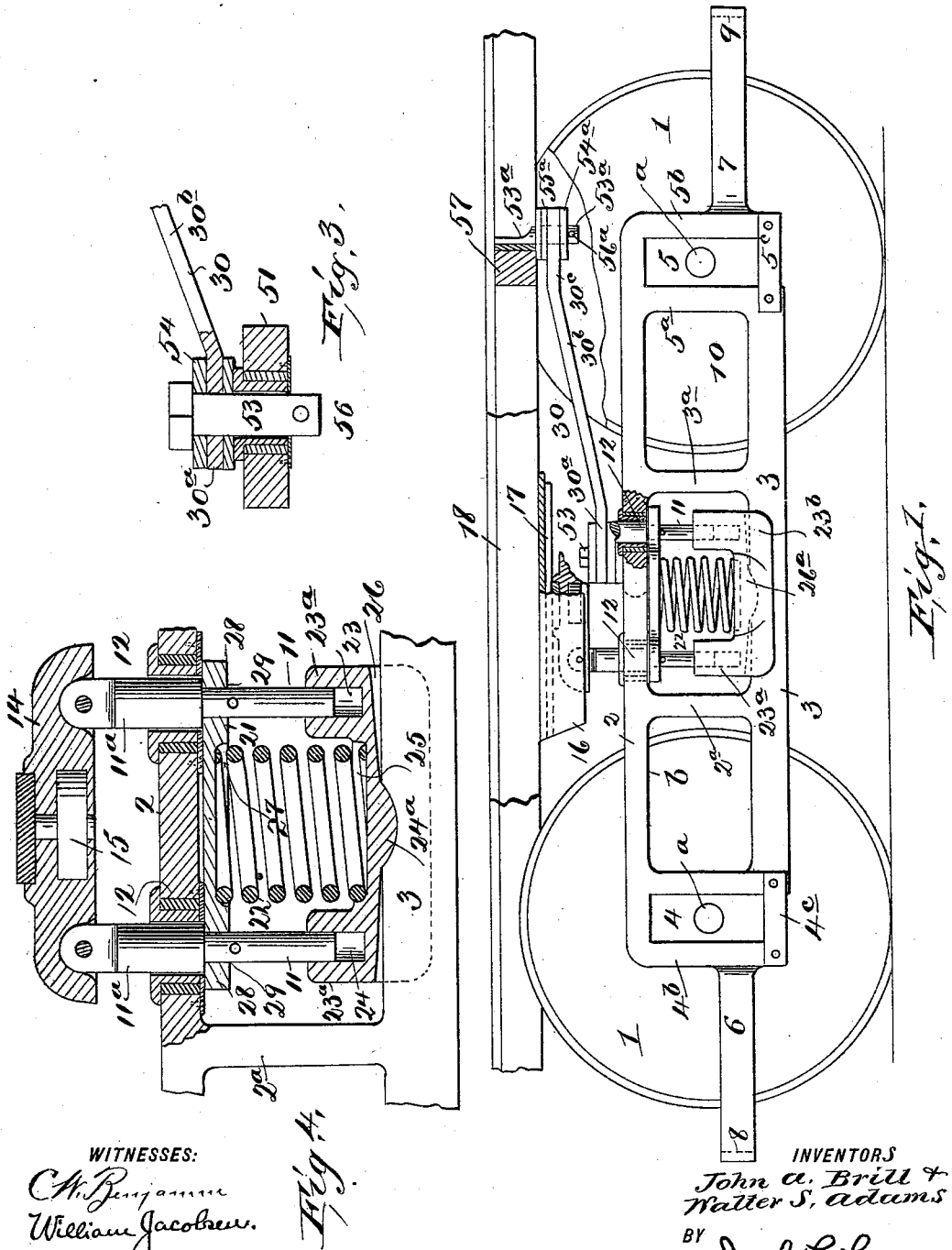
Figure 2:
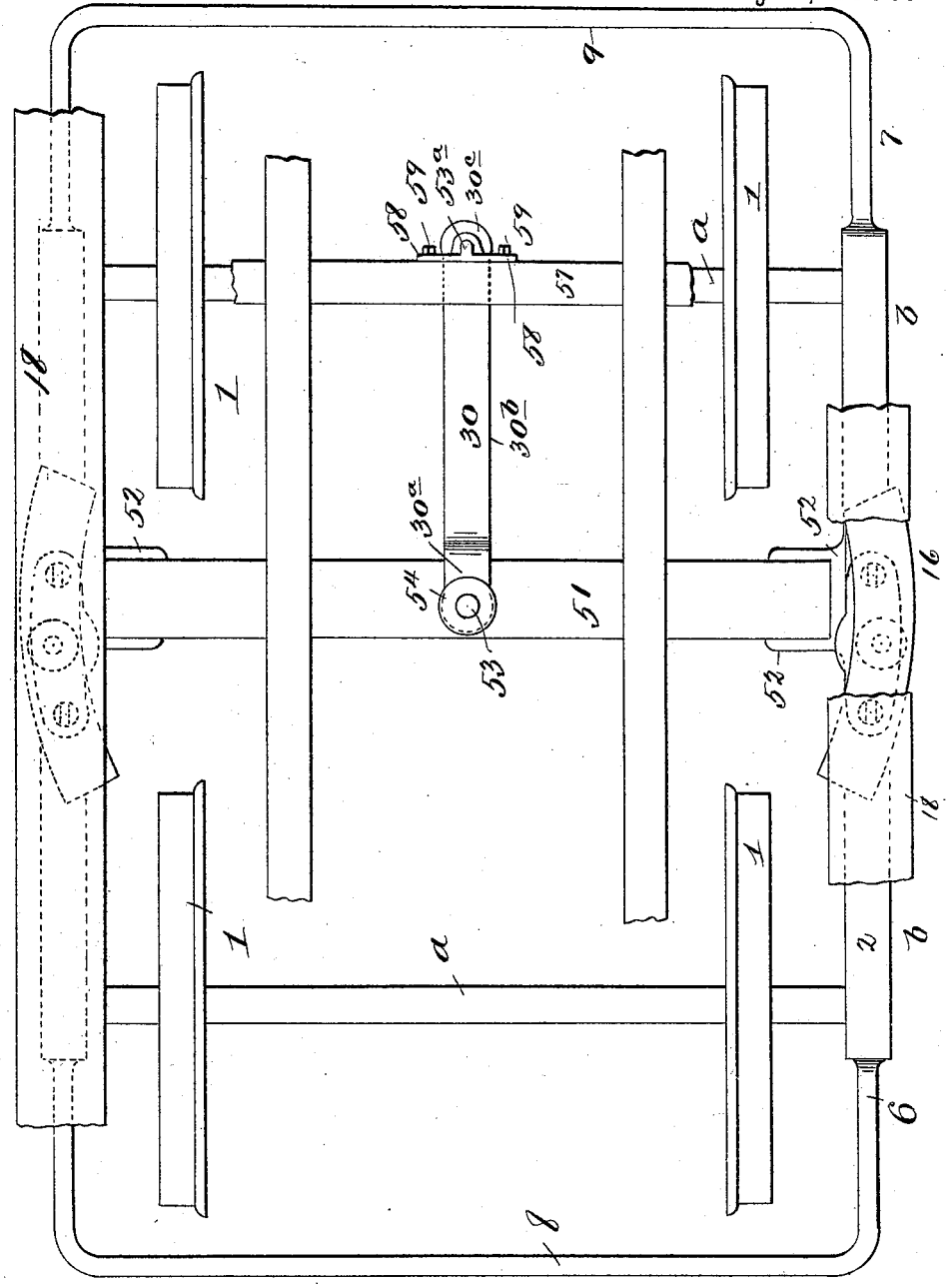

Figure 1 is a partly broken and sectional side elevation of the truck, showing the drawing device between the truck and the car-body and the side bearings. Fig. 2 is a partly-broken plan view thereof; and Fig. 3 is a detail sectional view, enlarged, of the cross-bar and the bearing for the pin connection. Fig. 4 is a sectional elevation of the side bearing and allied parts.

In the accompanying drawings, in which similar numerals and letters of reference indicate corresponding parts in the several views, the numerals 1, 1 indicate the truck wheels; $a$, $a$, the axles therefor; $b$, $b$, the side bars of the axle box frame, and 2, 3 the top and lower chords of the side bars; 4, 5, the axle box yokes; 6, 7, extensions therefrom, and 8, 9 the cross bars connecting said extensions. The chords 2, 3 of the axle box side bars are shown extending in parallel lines at suitable distances apart, forming between them a space 10, for a purpose hereinafter specified.

The chord 3 is connected at its ends to the uprights $4^a$, $5^a$, of the axle box yokes 4, 5, respectively, which uprights are connected to the top chords 2, which latter extend beyond said uprights and are connected to the outer vertical members $4^b$, $5^b$ of said yokes. By this means the side bars and yokes are united into a firm structure. The lower parts of the yokes 4, 5 may be connected by tie bars $4^c$, $5^c$.

The extensions 6, 7, are shown secured to, and extending from, members $4^b$, $5^b$ of the yokes 4, 5, and said extensions are substantially on a plane extending midway between the chords 2, 3, whereby brakes can be carried in proper positions relatively to the wheels 1, 1.

The parts 2, 3, $4^a$, $4^b$, $5^a$, $5^b$, 6, 7, 8 and 9 together comprise the axle box frame and may be formed into a homogeneous mass of metal. (See Figs. 1 and 2.) The side bars are shown thicker than the extensions 6, 7 (in Fig. 2) whereby guides or pedestals are formed for the spring posts 11, 11. In Fig. 1 the chords 2, 3 are shown centrally braced by standards or braces $2^a$, $3^a$, whereby the side bars are strengthened at their center or pedestal and bolster portions.

The spring posts 11, 11 are guided to have vertical movement in openings or bearings 12 in the top chord 2, 2, bushings being preferably provided to receive said posts. (See Fig. 4.) The posts 11, 11 are shown arranged in pairs on each side of the axle box frame, and said pairs of posts are provided with bearings 14, preferably pivotally connected with said posts as shown. The bearings 14 each have a friction roller 15 to engage a depending plate 16 extending from car rub plates 17 carried by the car body or the longitudinal sills 18 thereof.

The above and hereinafter mentioned parts 14, 15, 16, 17, 19 and 20 are substantially like those shown in our application filed February 17, 1893, Serial No. 462,730, to which cross reference is made, and need not be further described here. Their functions are to support the car body and permit a swiveling action of the same above the truck, as more fully set forth in said application.

The posts 11, 11 have enlarged upper parts 11$^a$, 11$^a$, that enter the bearings 12, and rest on a plate 21 that is supported on the side or car spring 22. (See Figs. 1 and 4.) The spring 22 is shown in the form of a coil spring and rests on a cradle 23 that is supported on the chord 3 of the axle box frame. This cradle 23 has lugs 23$^a$ and recesses 24 therein, in which the lower ends of the posts 11 are received and guided. The cradle 23 has a central circular recess 25 in which the side spring 22 rests, and on the under side the cradle 23 has a longitudinal recess 26 that receives the chord 3, whereby the cradle 23 is held on said chord, and lateral movement thereon is prevented, and to prevent the cradle from sliding on the chord it is provided with a lug 24$^a$ which enters a corresponding recess in the chord 3. The bottom of the cradle may be curved or inclined to permit the rocking of the cradle on the lug 24$^a$.

The central portion of the cradle 23 is enlarged at 26$^a$ to provide room for the spring 22. The plate 21 is also provided with a recess 27 on its under side in which the upper end of the coil spring 22 is located (see Fig. 4), the recesses 25—27 in the cradle 23 and plate 21 maintaining said spring in the proper position. The plate 21 is provided with oppositely extending lugs or webs 28 having apertures 29, through which the posts 11 pass, the enlarged parts 11$^a$ of said posts resting on said lugs or webs 28. (See Figs. 1 and 4.) With this construction the weight of the car is transmitted from the posts 11 to the plate 21, and then to the spring 22. As the posts are located on opposite sides of the spring 22, the weight will be evenly distributed on said spring through the medium of the plate 21.

While we have described but one spring 22 and its connections, it will be understood that there will be a set of such devices on each side of the axle box frame. In this form the chord 2 forms the pedestal for the spring post, and the lower chord 3 forms the bolster for supporting the car spring.

With the foregoing construction the weight of the car body will be carried between the wheels 1, 1, whereby pounding of the wheels upon the rails will be prevented, and the entire structure is uniformly strong, simple and compact.

The bearings 14 and plate 16—17 constitute means for forming a pivotal connection between the axle box frame and the car body, as specified in said application, Serial No. 462,730.

In Figs. 1, 2, and 3, are shown devices connecting the axle box frame with the car body or its cross or end sill to make a drawing connection. These devices are disposed in an arc described around the pivotal center of the truck, and are arranged to draw in all positions of the truck relatively to the car body.

In Figs. 1 and 2 is shown the draw bar 30 as extending to the pivotal center of the truck from a point on the car body between the wheels transversely, and past the truck center. For this purpose the draw car 30 is shown pivotally connected to a cross bar 51 carried by the chord 2 of the axle box frame. The cross bar 51 is shown held at its ends in recessed lugs 52 extending inwardly in pairs from the inner sides of the chord 2, said cross bar 51 being suitably secured to the lugs. (See Fig. 2.) At 53 is a pivot pin carried by the cross bar 51 at or near the pivotal center of the truck, the draw bar 30 being swiveled on said pin to draw therefrom. Rub plates 54, 55 are shown placed on opposite sides of the end of the draw bar 30 to provide a friction surface and steady the connection, said plates and the draw bar being suitably held on the pin 53, as by a cotter 56 passing through the pin.

To provide for the inclination of the draw bar to bridge the distance between the cross bar 51 and the bottom of the car body, the draw bar 30 is provided with a horizontal part 30$^a$ at the pin 53, an upwardly inclined central portion 30$^b$ and another horizontal portion 30$^c$ above the plane of the part 30$^a$, but of course the draw bar 30 could have any other desired shape for said purpose.

The end 30$^c$ of the draw bar 30 is pivotally connected with a pin 53$^a$ carried by a cross sill 57 of the car body, rub plates 54$^a$, 55$^a$ being placed on opposite sides of said end 30$^a$ and on said pin 53$^a$, having a cotter pin 56$^a$, similar to the parts 54, 55 and 56. By these means the draw bar 30 is properly held or supported at its ends and the desired swiveling action provided for. The pin 53$^a$ is shown provided with lugs 58, through which screws or bolts 59 pass to the sill 57, whereby said pin is securely held on said sill.

With the above described arrangement a positive drawing action takes place between the truck and the car body in all their positions, the strain on the draw bar being in the direction of its length, whereby great strength is derived.

It will be understood that the cross bar 51 is in no sense a truck bolster, but is merely used for obtaining a central drawing point for the draw bar 30, the bearings 14, posts 11, and their connecting parts constituting the sole supporting means for the car body.

The connection between the pins 53, 53$^a$ can be a loose one so as to permit of the car body rising and falling without disturbing the drawing connection; and an elastic bushing can be used for these parts, as is used to surround the spring posts 11, if desired, said bushing being described in the application Serial No. 462,730, to which cross reference is again made.

Many changes and modifications can be made in the structure shown herein without departing from the spirit of our invention.

We claim—

1. In a car truck, an axle box frame having side bars arranged in pairs, a spring between each pair of side bars, a post bearing on said spring, and a car body supporting plate pivotally connected to said post, substantially as described.

2. In a car truck, an axle box frame having side bars arranged in pairs, a spring between each pair of side bars, supporting posts on opposite sides of said spring, and a car body supporting plate pivotally connected to each of said posts, substantially as described.

3. In a car truck, an axle box frame having side bars, guides in said side bars, supporting posts in said guides, and car body supporting plates pivotally resting on said posts, combined with a spring on each side of said frame and located between pairs of said posts, and a plate on each of said springs, said plate receiving said posts, substantially as described.

4. In a car truck, an axle box frame having side bars arranged in pairs, a spring between said bars, a support for said springs, a plate resting on each spring, said plate having a central circular recessed portion, lugs or webs extending in opposite directions from said circular portion of said plate, openings in said lugs or webs, posts passing through said openings, and bearings connecting said posts in pairs, as and for the purpose specified.

5. An axle box frame composed of two parallel side bars on each side, and axle box yokes having vertical members $4^a, 4^b, 5^a, 5^b$, the members $4^a, 5^a$, being connected to the ends of the lower side bars, said members being connected at their upper ends to the upper side bars between their ends, the members $4^b, 5^b$, of the yokes depending from the ends of said upper side bars, extensions 6, 7, from the members $4^b, 5^b$ intermediate their ends, and cross bars connected with said extensions, substantially as described.

6. A car body combined with a truck, having a substantially stationary axle box frame, side bars of the axle box frame having top and lower chords, bearings, posts therefor spring supported centrally on the lower chord and passing through the upper chord, curved restraining plates on the car body engaging the bearings, and a draw bar pivotally connected with said truck at or near the pivotal center thereof, said draw bar being pivotally connected with said body at a point lying in an arc of a circle described around said pivotal center, substantially as described.

7. A car body, combined with a truck, having an axle box frame, and side bars having top and lower chords, a draw bar pivotally connected with said cross bar and with the car body and having lateral vibration in respect to both, vertical pins connecting the draw bar with the car and cross bar, curved restraining plates on the car, posts and bearings spring supported on the lower chord above the top chord, said posts passing through the top chord, substantially as described.

8. A car body combined with a truck, bearings and restraining plates between said parts, a cross bar on said truck and located in line with said bearings, a vertical pivot pin carried by said cross bar at the pivotal center of the truck, a draw bar connected with said pin, and a vertical pivot connection between said draw bar and the car body, at a point in an arc described around the pivotal center of the truck, substantially as described.

9. A car body combined with a truck having an axle box frame provided with integral upper and lower side bars, lugs extending inwardly from said upper side bars, a cross bar secured to said lugs, and a draw bar pivoted to the center of said cross bar and to the car body at a distance from its connection with said cross bar, substantially as described.

10. A car body combined with a truck, a cross bar at its upper part and passing through its pivotal center, a vertical pin at the longitudinal center of said cross bar, a longitudinally extending draw bar 30 journaled on said pin, plates on opposite sides of said draw bar at said pin, a vertical pin on the car body to which said draw bar is journaled, and plates on said last mentioned pin on opposite sides of said draw bar, substantially as descibed.

Signed at New York, in the county of New York and State of New York, this 30th day of December, 1893.

JOHN A. BRILL.
WALTER S. ADAMS.

Witnesses:
B. S. WISE,
JOSEPH L. LEVY.